W. P. DEACON & J. E. JORDAN.
SUPPORTING STAND FOR AUTOMOBILES.
APPLICATION FILED DEC. 29, 1913.
1,144,110. Patented June 22, 1915.
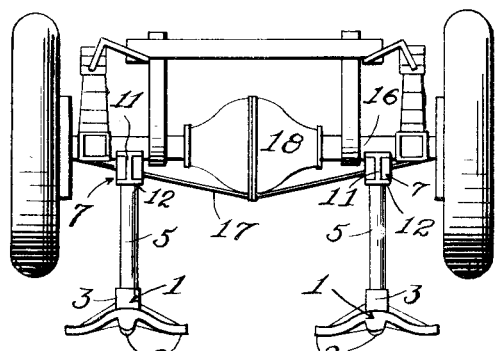
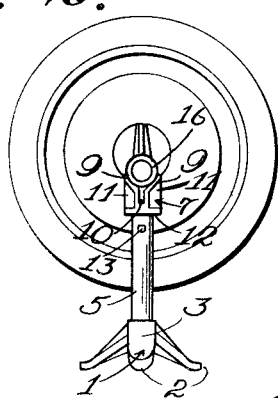
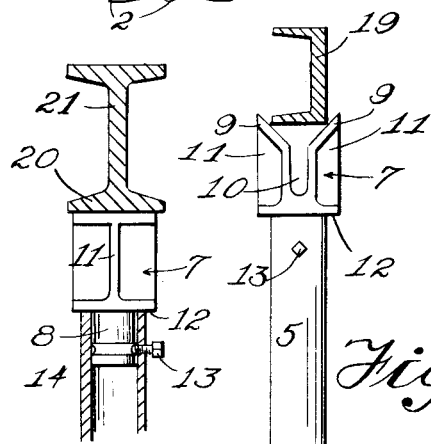
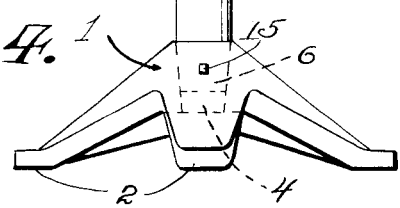

UNITED STATES PATENT OFFICE.

WILLIAM P. DEACON, OF EAST ORANGE, AND JOHN E. JORDAN, OF NEWARK, NEW JERSEY, ASSIGNORS OF ONE-THIRD TO HERBERT A. DEACON, OF EAST ORANGE, NEW JERSEY.

SUPPORTING-STAND FOR AUTOMOBILES.

1,144,110.   Specification of Letters Patent.   Patented June 22, 1915.

Application filed December 29, 1913. Serial No. 809,167.

*To all whom it may concern:*

Be it known that we, WILLIAM P. DEACON and JOHN E. JORDAN, citizens of the United States, residing at East Orange and Newark, in the county of Essex and State of New Jersey, respectively, have invented certain Improvements in Supporting-Stands for Automobiles, of which the following is a specification.

The objects of this invention are to provide means for supporting an automobile while in storage, so as to take the weight off the tires; to provide such a support readily adaptable to any automobile; to provide such a support which shall be rigid and firm in use, and yet of separable structure so as to be knocked down when not in use; to thus facilitate storage and shipping of the device, and to obtain other advantages and results as may be brought out in the following description.

Referring to the accompanying drawings, in which like numerals of reference indicate the same parts throughout the several figures.

Figure 1 is a rear elevation of our supporting stand in use; Fig. 2 is a side elevation of the same; Fig. 3 is an enlarged view similar to Fig. 2 showing the stand under different conditions; Fig. 4 is a detail of the head under other conditions; Fig. 5 is a detail perspective of the head, and Fig. 6 is a side view of a certain auxiliary shank.

In the specific embodiment of the invention illustrated in the drawings, 1 indicates the base of the supporting stand, preferably composed of three diverging feet 2, formed integral with the central body 3. Said body 3 has shaped therein, the downwardly tapering socket 4, the center line of said socket being substantially perpendicular to the plane of the feet 2. A shank 5, preferably tubular has the lower end 6 thereof, tapered to fit into the socket 4 and firmly support the shank in a vertical position.

The head 7, as best illustrated in Fig. 5, has depending therefrom a stem 8 adapted to fit into the upper tubular end of the shank 5, thereby rotatively mounting said head upon the shank. The head is preferably composed of flanges 9, 9 arranged in V-shape, as shown, with an elongated slot 10 at the vertex of the angle. Ribs 11 are shown as means for reinforcing said flanges to withstand the lateral, as well as the vertical, component of the pressure to which they may be subjected in use. The shoulder 12 transmits such pressure to the shank 5 and retains the head upon the said shank.

Where the device is to be used in a garage or the like, it will be desirable to move the same about and not have the various parts become separated. For this purpose we employ a set screw 13 or the like in the shank to engage in a circumferential groove 14 in the stem 8, whereby the head is retained from lateral displacement, but is free to revolve. Another set screw 15 in the body of the base wedgingly engages the tapered end 6 of the shank securing the same to the base 1, if desired.

In the use of the device as illustrated in Fig. 1 and Fig. 2, the rear axle 16 of an automobile is first jacked up by any suitable means and the supporting stands placed thereunder, to hold it up. The truss rod 17 which usually passes under the differential casing 18 lies in the slot 10, and the tubular axle 16 rests upon the flanges 9, 9 and transmits the whole load thereto. The flanges 9, 9 are also adapted to receive angular structures such as the channel 19 illustrated in Fig. 3. In case the lower portion, such as the flange 20 of the I-beam 21 in Fig. 4, is wider than the space between the flanges 9, 9, the head may be revolved and the beam supported upon the ends of said flanges 9, 9, as shown in said Fig. 4. It will thus be seen that the head 7 is adapted to receive and properly support a variety of different shaped members.

With every stand of our improved construction we prefer to furnish an auxiliary shank 22, shown in Fig. 6, which is sufficiently longer than the shank 5 so that it may be substituted therefor to enable the stand to take under the frame of the chassis and support the same when it is desired to remove an axle or the like.

Having thus described the invention, what we claim is:

A supporting stand for automobiles and the like, comprising in combination a base having a socket, a shank adapted to detachably engage at one end said socket and extend upward from the said base, a head having a circumferentially grooved stem adapted to rotatably enter the other end of said shank, the body of the head adapted to seat against said end of the shank and having flaring flanges forming a transverse recess, and a set screw working through the side of the shank into said groove of the stem of the head.

WILLIAM P. DEACON.
JOHN E. JORDAN.

In the presence of—
C. H. NEVIUS,
M. J. NEVIUS.